United States Patent [19]

Delay

[11] 4,216,368
[45] Aug. 5, 1980

[54] REMOTE CONTROL DEVICE FOR ARC WELDING

[76] Inventor: Calvin J. Delay, 406-B S. Fannin, Amarillo, Tex. 79106

[21] Appl. No.: 964,251

[22] Filed: Nov. 27, 1978

[51] Int. Cl.² .............................................. B23K 9/10
[52] U.S. Cl. .................................................... 219/132
[58] Field of Search ......................... 219/132; 335/207

[56] References Cited

U.S. PATENT DOCUMENTS

| | | | |
|---|---|---|---|
| 2,043,331 | 6/1936 | Notvest | 219/132 |
| 2,642,515 | 6/1953 | Bagg | 219/132 |
| 2,872,566 | 2/1959 | Leppala | 219/132 |
| 3,041,526 | 6/1962 | Rybolt | 219/132 |
| 3,233,060 | 2/1966 | Wintriss | 335/207 |
| 3,258,554 | 6/1966 | Cloup | 335/207 |
| 3,477,005 | 11/1969 | Weems | 219/132 |
| 3,562,681 | 2/1971 | Binder | 335/207 |
| 3,811,085 | 5/1974 | Saulsman | 219/132 |

FOREIGN PATENT DOCUMENTS

| | | |
|---|---|---|
| 2507822 | 9/1976 | Fed. Rep. of Germany ........... 219/132 |
| 883052 | 11/1961 | United Kingdom ..................... 219/132 |

*Primary Examiner*—B. A. Reynolds
*Assistant Examiner*—Clifford C. Shaw
*Attorney, Agent, or Firm*—Wendell Coffee

[57] ABSTRACT

The controls for a arc welder are located at the rod holder. The rod holder controls include push buttons which cause electrical motors geared to the control shafts to rotate in either a forward or reverse direction.

1 Claim, 2 Drawing Figures ered (219/132).
REMOTE CONTROL DEVICE FOR ARC WELDING

CROSS REFERENCE TO RELATED APPLICATIONS

The inventor filed a patent application entitled "Remote Control Device For Direct Current Arc Welder" on Dec. 27, 1976, Ser. No. 748,276. That application is now abandoned.

BACKGROUND OF THE INVENTION (1) Field of the Invention

This invention relates to electric arc welding with systems current supply remotely controlled (219/132).

(2) Description of the Prior Art

Prior workers in the field have provided controls at the rod holder grip for the control of an electric welder. Four such patents were cited in applicant's prior application cited above. They are:

Hall U.S. Pat. No. 2,425,183
Welch U.S. Pat. No. 2,658,132
Redekopp U.S. Pat. No. 2,484,959
Stahmer U.S. Pat. No. 2,379,837

HALL, WELCH and REDEKOPP all disclose positioning an indicator at the rod holder to a certain position which moves the controls to a similar position, as understood by the applicant. STAHMER discloses a similar control, i.e., an indicator is moved to the rod holder, however, in this case the moving of the rod holder indicator causes contacts to make and break which actuate ratchets at the control. Because of the ratchet nature they move only in one direction. Also, STAHMER discloses using the welding current as the control current.

SUMMARY OF THE INVENTION (1) New and Different Function

This invention is particularly related to those welding machines which are powered by an internal combustion engine. I.e., those which are portable machines which are not themselves dependent upon electrical power supply for operation. In these machines with internal combustion engines there is normally a storage battery in association therewith for starting the engine. This invention utilizes the storage battery to provide the power and source of energy for the control circuit thereby avoiding using the energy from the welding generator itself. In addition, this invention utilizes electric motors which are connected to gears attached to the control shaft for smoothly rotating them. The invention utilizes automobile window control motors. These motors have been manufactured and sold by the millions and, therefore, they are readily available on the market, dependable and low in cost. Also, they are reversible and designed to use as their source of power 12 v. storage battery the same as is normally provided on the internal combustion engine on the welding machine in any event.

Because the adjustment is made from a separate 12 v source, the fine adjustment may be made while continually welding without breaking the arc. Therefore, it may be seen that the function of the total combination far exceeds the functions of the individual elements such as storage batteries, switches, motors and the like.

(2) Objects of this Invention

An object of this invention is to control an electric welder.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENT

Figure 1:
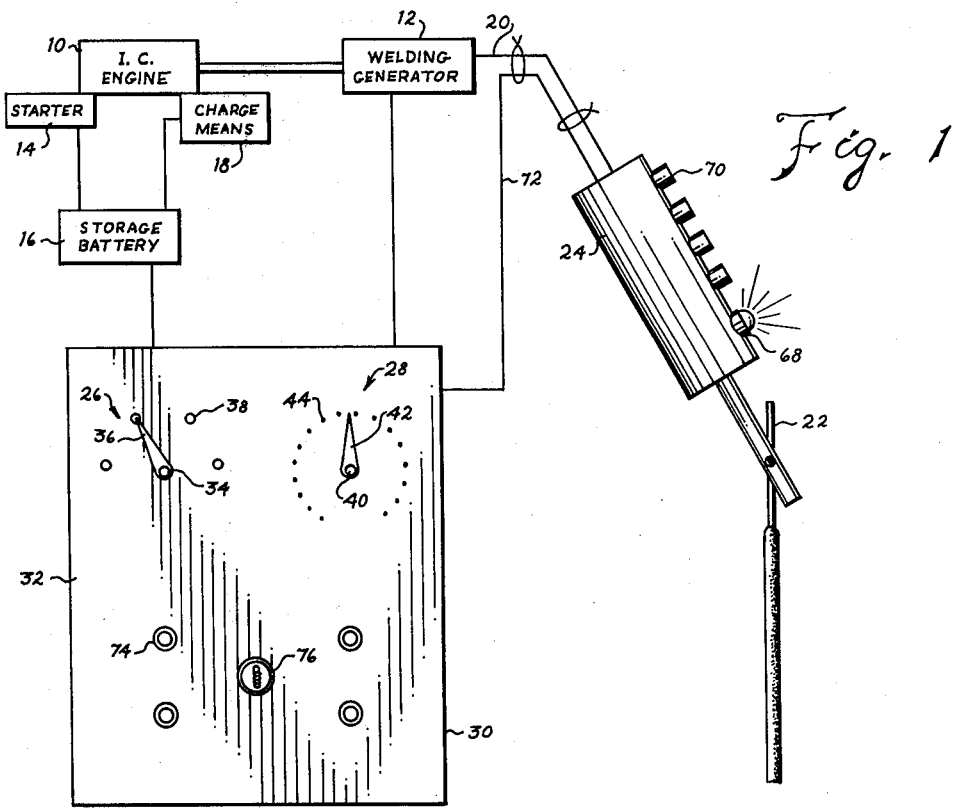
FIG. 1 is a schematic representation of a welding machine with controls according to my invention.
Figure 2:
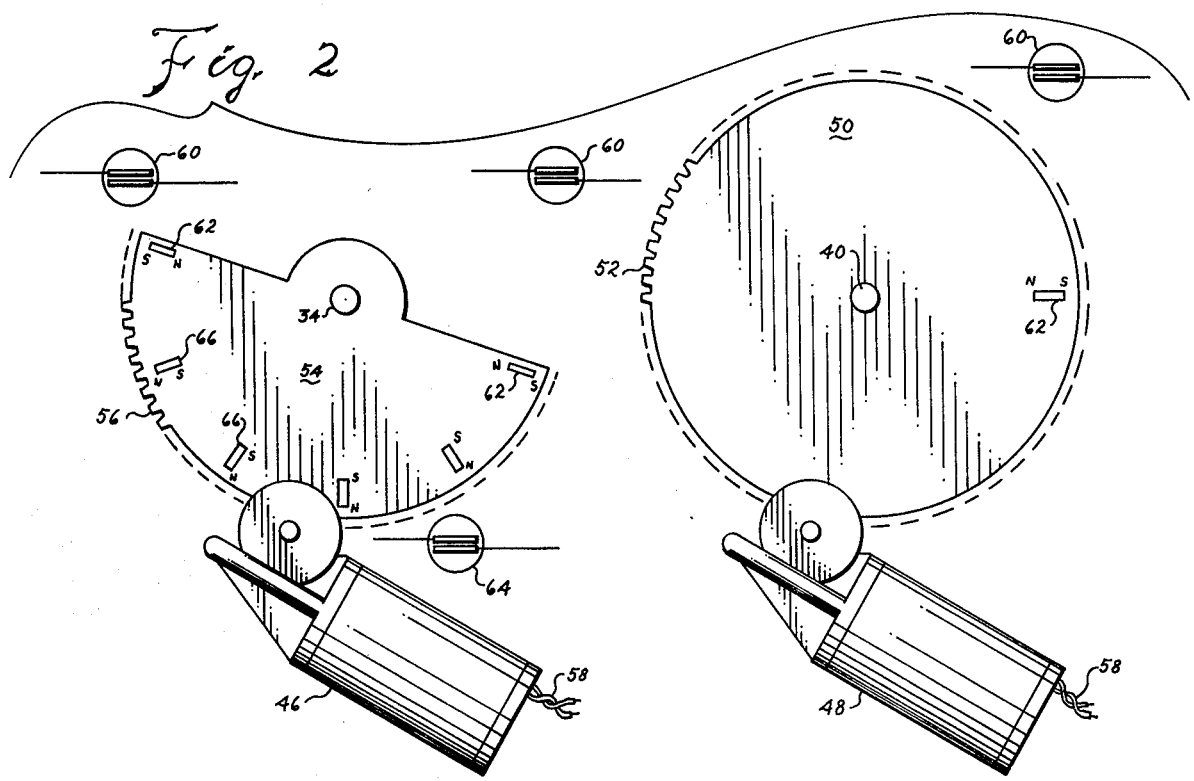
FIG. 2 is a partial elevational view of the control panel with the cover removed showing the gears on the control shafts and the reed switches represented somewhat schematically.

Referring to the drawing and more particularly to FIG. 1, there may be seen represented a typical welding machine. Typically the welding machine includes internal combustion engine 10 which connected to welding generator 12. Starter 14 together with storage battery 16 is used to start the internal combustion engine 10. Charge means 18, in the form of an alternator, is used to keep the storage battery charged. In addition the welding generator is connected by heavy electrical conductor 20 to the welding rod or welding electrode 22 which is held by a rod holder grip 24. To weld different metals and different thicknesses of metal with different rods it is necessary to control the generator. On generators in commercial use today there are normally two controls, a coarse control 26 and a fine control 28. These controls are conveniently located on control panel 30 having cover 32. Normally, the controls will include a coarse control shaft 34 which has a pointer 36 connected to it on the outside of the cover which together with a series of indicia 38 indicate position of the coarse control. Also, the fine control will normally have a fine control shaft 40 which will have pointer 42 on the outside of the cover 32 which together with other indicia 44 will indicate the position of the fine control. Those having ordinary skill in the welding art will recognize that the specific embodiment as described to this point is old, well known and has been commercially on the market for many years prior to my invention. Skilled persons will also recognize that in many instances the coarse control 26 has a series of positions or contacts. I.e, it is not a continuous control to be moved to any place by the rotation of the coarse control 26 has a series of positions or contacts. I.e, it is not a continuous control to be moved to any place by the rotation of the coarse control shaft 34 but only at the limited number of set positions, e.g. four or five set positions. Also, they will understand that the control should be set on one of the positions and not in between two of the set positions.

According to my invention, I modify the standard control panel of a standard welding machine by removing the pointers 36 and 42 and then removing the cover 32. Then I attach a standard electric automobile window control motor 46 for the coarse control shaft 34 and another standard automobile window control motor 48 close to the fine control shaft 40. A full gear 50 is placed upon the fine control shaft 40. The teeth 52 of this gear 50 are made to mesh with the teeth upon the reversible control motor 48. I prefer to use an automobile window control motor for the motors 46 and 48 because they have been used by the automobile industry for many years. Therefore, they have been manufactured by the millions and the design of these motors have been perfected so that they are sturdy, reliable and long lasting. Also, they are readily available on the market at a reasonable price.

A sector or partial gear 54 is placed upon the coarse control shaft 34. It likewise has teeth 56 which readily mesh with the teeth of its motor 46. There is provided connection means for connecting the motors 46 and 48 to storage battery 16. These connection means include many individual elements. These connection means certainly include wires 58 leading from the motors. They also include reed limit switches 60 which are structurally connected to the control panel. The reed limit switches 60 connected to the control panel 30 are activated by magnets 62 attached as with clips and screws to the gears 50 and 54. Those having ordinary skill in the electrical arts will understand how to connect the magnets to the gears 50 and 54 so as to activate the limit switches 60 when the magnets become proximate to the limit switches 60. Also, those with ordinary skill in the art will understand how to connect the electrical circuits with the suitable relays so that when the limit switches 60 are actuated by the magnets 62 they will inactivate the motor 46 if it is magnet upon the gear 54 which is proximate a limit switch 60 or inactivate the motor 48 if it is a magnet 62 on gear 50 that comes near the reed limit switch adjacent thereto.

As discussed above, there are certain desired positions for the coarse adjustment shaft 34. Therefore, a position reed switch 64 is placed adjacent to the gear 54. A series of position magnets 66 are attached to the gear 54 in such a position than when the shaft 34 is in one of the desired positions one of the magnets 66 will be adjacent to the position switch 64. The position switch is also a magnetic sensitive reed switch. Also, those having ordinary skill in the electrical art will understand how to connect the storage battery 16, the position switch 64 and lamp 68 located upon rod holder grip 24 so that the lamp 68 is lit when one of the magnets 66 is positioned proximate the position switch 64. Also, a part of the electrical connection means from the motors 46 and 48 to the storage battery 16 include actuation switches 70 and 74. Those having skill in the art will recognize that the electric motors used, i.e., the standard automobile window motors are reversible motors. These reversible motors are electrically connected to four push button rod holder grip switches 70 located upon the rod holder grip 24 and for this reason referred to as grip switches 70. One of the grip switches would cause motor 46 to run in a forward direction, another of the grip switches would cause motor 46 to run in a reverse direction while yet another grip switch 70 would cause motor 48 to run in a forward direction and another grip switch 70 would cause motor 48 to run in a reverse direction. Therefore, it is necessary to have electrical wires 72 run from the control panel 30 to the rod holder grip 24. For convenience these wires are included with the same cable as electrical conductor 20.

After the control panel 30 is so modified, the cover 32 and points 42 are replaced.

It will often be desirable to rotate the shafts 34 and 40 from the control panel itself. Therefore, four panel switches 74 are provided on the control panel. For many reasons, it is desirable that the welding generator be controlled from only the control panel or only the rod holder grip. Therefore, key switch 76 is provided upon the cover 32 of control panel 30. The switch 76 is a key switch, i.e., it is a switch which is locked and requires a key to change the position of the switch. In this way unauthorized persons are prevented from changing the position of switch 76 from wherever the welder desires it to be. I.e., switch 76 provides a means for selecting between the panel switches 74 and the grip switches 70 as to which control the reversible motors 46 and 48.

It will be understood that the electrical connection means for connecting the reversible motors 46 and 48 to the storage battery 16 includes the wires 58, reed limit switches 60, magnets 62, grip switches 70, electrical wire 72, panel switches 74 and key switch 76. The position reed switch 64 together with position magnets 66 and indicator lamp 68 strictly speaking are not a portion of the connection means but are merely auxillary thereto.

As an aid to correlating the terms of the claims to the exemplary drawing, the following catalog of elements is provided:

| | |
|---|---|
| 10 internal combustion engine | 44 indicia |
| 12 welding generator | 46 window control motor |
| 14 starter | 48 window control motor |
| 16 storage battery | 50 gear |
| 18 charge means | 52 teeth |
| 20 electrical conductor | 54 sector/partial gear |
| 22 welding rod or electrode | 56 teeth |
| 24 rod holder grip | 58 wires |
| 26 coarse control | 60 reed limit switches |
| 28 fine control | 62 limit magnets |
| 30 control panel | 64 position reed switch |
| 32 cover | 66 series of position magnets |
| 34 coarse control shaft | 68 lamp |
| 36 pointer | 70 grip switches |
| 38 indicia | 72 electrical wires |
| 40 fine control shaft | 74 panel switches |
| 42 pointer | 76 key switch |

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a welding machine having
   a. an internal combustion engine,
   b. a storage battery for starting the internal combustion engine,
   c. charging means for keeping the storage battery charged,
   d. a welding generator driven by the internal combustion engine,
   e. a control panel for the welding generator having (i) a coarse control shaft which chooses a coarse control when rotated to a desired position,
(ii) a fine control shaft which chooses a position of a rheostat when rotated to a desired position,
f. a cover on the control panel,
g. a pointer on each of the shafts for indicating the position of the shaft, and
h. a rod holder grip for holding a welding rod electrically connected to the welding generator;

the improved structure for positioning each of said shafts comprising in combination with the above:

j. a gear attached to each of said shafts beneath the cover,
k. a reversible electric motor on the control panel drivingly connected to said gear,
m. electrical connections from each of said motors to said storage battery,
n. said electrical connections including rod holder grip switches upon the rod holder grip for actuating the motors either in a forward or a reverse direction,
o. a key switch upon the control panel cover,
p. said key switch being operable only by a key,
q. panel switches on the control panel,
r. said key switch selecting between
  (i) said panel switches, and
  (ii) said grip switches as to which control said reversible motors,
s. a limit switch on the control panel,
t. connection means for connecting said limit switch to one of the motors to inactivate the motor,
u. a magnet mounted upon the gear to magnetically control the limit switch, and thus
v. inactivate the motor,
w. an indicator lamp upon the rod grip handle,
x. a magnetically sensitive reed switch mounted upon the control panel,
y. at least one magnet attached to one of said gears so that when the magnet is near the reed switch, the indicator lamp will light.

* * * * *